United States Patent
Mao et al.

(10) Patent No.: US 9,433,069 B2
(45) Date of Patent: Aug. 30, 2016

(54) ELECTRONIC DEVICE AND CONDUCTIVE GROUND ELEMENT

(71) Applicant: Wistron Corporation, New Taipei (TW)

(72) Inventors: Zhong-Hui Mao, New Taipei (TW); Te-Hsiung Hsieh, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 211 days.

(21) Appl. No.: 14/069,456

(22) Filed: Nov. 1, 2013

(65) Prior Publication Data

US 2014/0168912 A1 Jun. 19, 2014

(30) Foreign Application Priority Data

Nov. 15, 2012 (CN) .......................... 2012 1 0461331

(51) Int. Cl.
G06F 1/16 (2006.01)
G06F 1/18 (2006.01)
H05F 3/02 (2006.01)

(52) U.S. Cl.
CPC ................. *H05F 3/02* (2013.01); *G06F 1/181* (2013.01); *G06F 1/182* (2013.01)

(58) Field of Classification Search
CPC ....... G06F 1/186; G06F 1/182; G06F 1/1656
USPC ............................................ 361/799; 174/51
See application file for complete search history.

(56) References Cited

U.S. PATENT DOCUMENTS

| 5,884,988 A * | 3/1999 | Foo .......................... G06F 1/181 312/223.2 |
| 6,058,019 A * | 5/2000 | Graves ..................... G06F 1/184 174/51 |
| 6,231,356 B1* | 5/2001 | Stutts ................. H01R 13/6485 439/607.28 |
| 7,193,834 B2* | 3/2007 | Oh ...................... H01R 13/6485 361/212 |
| 7,571,884 B2* | 8/2009 | Chen .................... G11B 33/124 248/291.1 |

(Continued)

FOREIGN PATENT DOCUMENTS

| CN | 201927846 | 8/2011 |
| CN | 201927846 U | 8/2011 |

(Continued)

OTHER PUBLICATIONS

The Office Action issued to Taiwanese Counterpart Application No. 101143683 by the Taiwan Intellectual Property Office on Mar. 23, 2015 along with an English translation of relevant portions.

(Continued)

*Primary Examiner* — Jeremy C Norris
*Assistant Examiner* — Nathan Milakovich
(74) *Attorney, Agent, or Firm* — Hunton & Williams LLP

(57) ABSTRACT

An electronic device includes a metallic housing having a front wall with a mounting hole communicating with an interior thereof, and a front cover spaced apart from the front wall and having an access slot corresponding in position to the mounting hole. A circuit module includes a circuit board disposed within the metallic housing and having an extension protruding out of the front wall via the mounting hole, and an electrical connector disposed on the extension. A conductive ground element is disposed pivotally within the metallic housing in proximity to the mounting hole, and abuts against the electrical connector to conduct static electricity of the electrical connector to the metallic housing.

12 Claims, 7 Drawing Sheets

(56) References Cited

U.S. PATENT DOCUMENTS

| | | | |
|---|---|---|---|
| 8,152,541 B2* | 4/2012 | Sakiyama | H01R 13/64 439/138 |
| 8,794,984 B2* | 8/2014 | Chen | H01R 13/5213 439/136 |
| 9,137,922 B2* | 9/2015 | Lin | H05K 7/1487 |
| 9,326,402 B2* | 4/2016 | Kuo | H05K 5/0239 |
| 2006/0046542 A1* | 3/2006 | Obara | H01R 13/4536 439/135 |
| 2009/0032279 A1* | 2/2009 | Gong | H05K 5/0239 174/67 |
| 2009/0196007 A1* | 8/2009 | McColloch | G02B 6/4201 361/818 |
| 2012/0182704 A1* | 7/2012 | Lee | H05K 9/0067 361/752 |
| 2013/0021725 A1* | 1/2013 | Huang | G06F 1/1656 361/679.01 |
| 2013/0215557 A1* | 8/2013 | Ko | H04M 1/0274 361/679.01 |
| 2014/0113467 A1* | 4/2014 | Senatori | G06F 1/1633 439/142 |

FOREIGN PATENT DOCUMENTS

| | | |
|---|---|---|
| TW | 1347818 | 12/1996 |
| TW | 200934355 | 1/1997 |
| TW | 200915682 A | 4/2009 |
| TW | 200934355 | 8/2009 |

OTHER PUBLICATIONS

The Office Action issued to Chinese Counterpart Application No. 201210461331.6 by the State Intellectual Property Office of the P.R.C. on Jun. 19, 2015 along with an English translation of the sections boxed in red.

The Office Action issued to Taiwanese Counterpart Application No. 101143683 by the Taiwan Intellectual Property Office on Oct. 15, 2015 along with an English translation of boxed sections.

\* cited by examiner

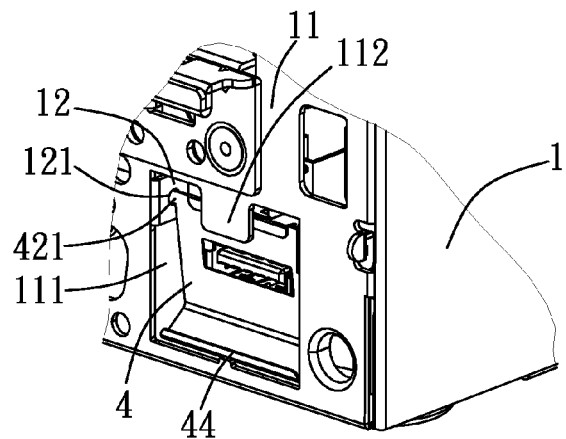
F I G. 3
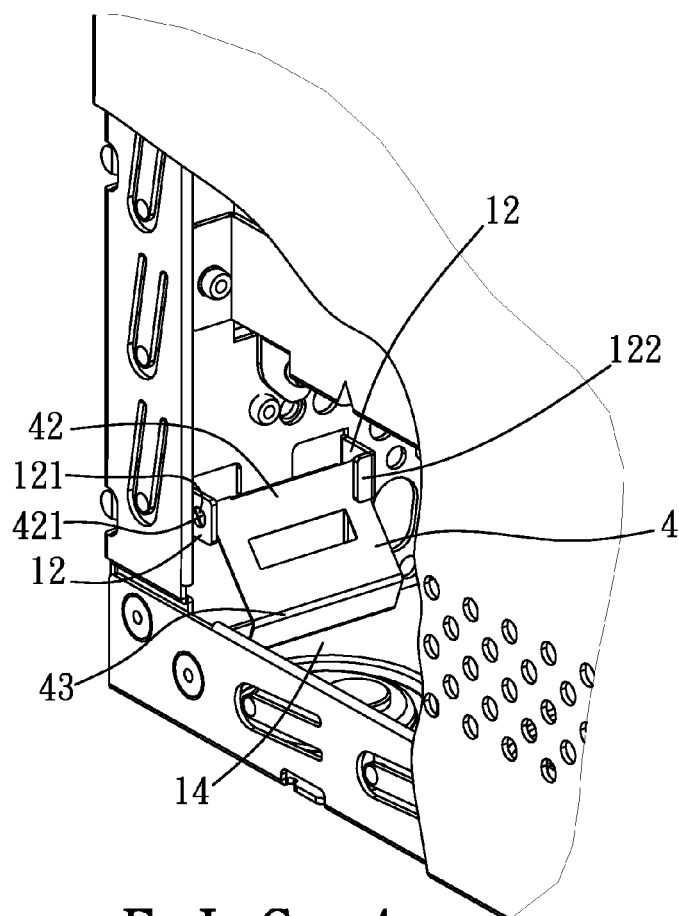
F I G. 4

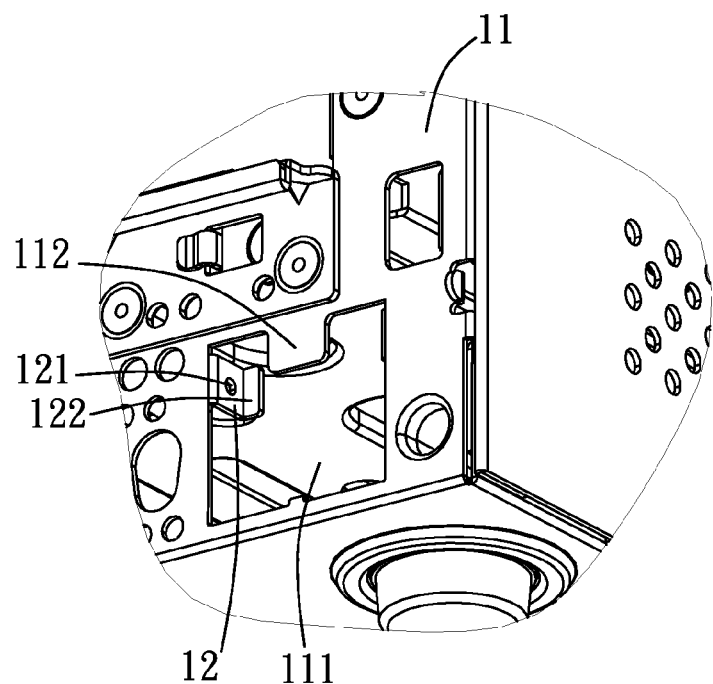
F I G. 8
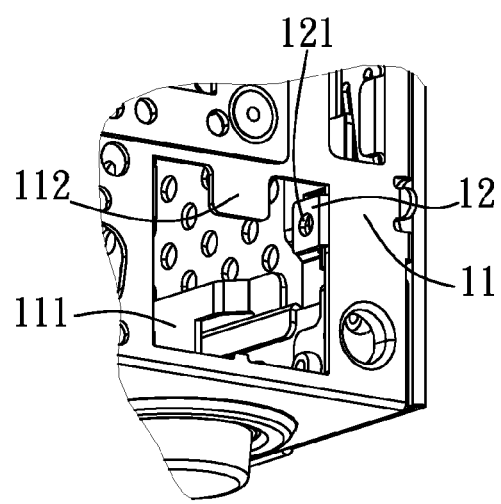
F I G. 9

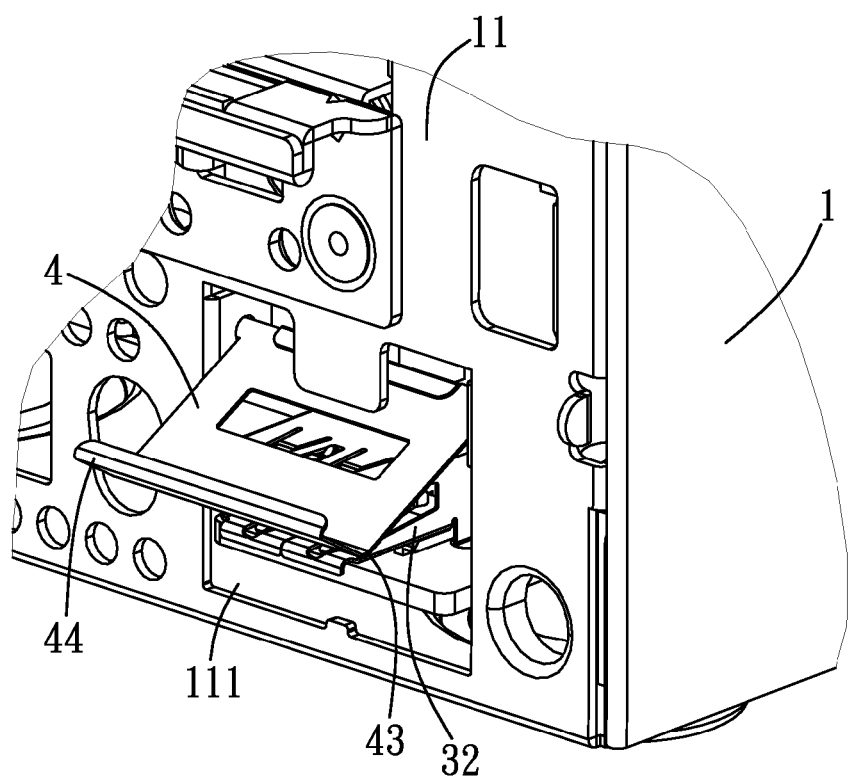
F I G. 10

ELECTRONIC DEVICE AND CONDUCTIVE GROUND ELEMENT

CROSS-REFERENCE TO RELATED APPLICATION

This application claims priority of Chinese Patent Application No. 201210461331.6, filed on Nov. 15, 2012, the disclosure of which is hereby incorporated by reference in its entirety.

BACKGROUND OF THE INVENTION

1. Field of the Invention

The invention relates to an anti-electrostatic discharge conductive ground flexible plate, and more particularly to a conductive ground flexible plate that is pivotable out of a metallic housing and an electronic device having the conductive ground flexible plate.

2. Description of the Related Art

Generally, an electronic device, such as a server or a host of a desktop computer, typically has a housing that includes a metallic casing and a plastic front cover plate, and a circuit board provided with electronic elements is disposed within the metallic casing. To facilitate connection of an external storage media for data transmission by a user, an electrical connector is disposed on both the front cover plate and a rear end face of the metallic casing which is opposite to the front cover plate for insertion of an electrical connector disposed on the external storage media. However, electrostatic discharge (ESD) is likely to occur when two corresponding electrical connectors are electrically connected to each other, thereby causing damage to the electronic device. In order to avoid occurrence of the ESD, a metallic housing of the electrical connector disposed on the electronic device is made to contact with the metallic casing of the electronic device to conduct static electricity to ground.

Because the electrical connector disposed on the front cover plate will protrude out of the metallic casing of the electronic device so that the electrical connector housing cannot directly contact the metallic casing of the electronic device, an additional conductive medium is required for connecting the electrical connector housing to the metallic casing of the electronic device. A common practice is to fix a metallic flexible plate on an outer side of the metallic casing of the electronic device, so that the metallic flexible plate can press abuttingly against the electrical connector housing to conduct static electricity. Because the metallic flexible plate protrudes out from the metallic casing of the electronic device, during transporting of the metallic casing, the metallic flexible plate is prone to bump against an external object or be pressed and deformed by the packing material, resulting in the entire metallic casing being ruined and discarded. Further, an operator may easily get hurt during assembly, which does not meet the safety regulations. Therefore, how to avoid deformation of the metallic flexible plate and to enhance safety are issues to be addressed.

SUMMARY OF THE INVENTION

Therefore, an object of the present invention is to provide a conductive ground element that is configured to be received in and pivotable out of a metallic housing.

Another object of the present invention is to provide an electronic device having the conductive ground element.

According to one aspect of this invention, an electronic device comprises a metallic housing, a front cover, a circuit module and a conductive ground element. The metallic housing includes a front wall which has a mounting hole in spatial communication with an interior of the metallic housing. The front cover is assembled to the metallic housing and covers the front wall. The front cover is spaced apart from the front wall and has an access slot corresponding in position to the mounting hole. The circuit module includes a circuit board disposed within the metallic housing and having an extension protruding out of the front wall via the mounting hole, and an electrical connector disposed on the extension and having a connector port exposed from the front cover via the access slot. The conductive ground element is disposed pivotally within the metallic housing in proximity to the mounting hole, and abuts against the electrical connector to conduct static electricity of the electrical connector to the metallic housing.

The metallic housing further includes a pair of spaced-apart brackets that extend from the front wall toward the interior of the metallic housing at two opposite sides of the mounting hole and that respectively have a pivot hole. The conductive ground element has a pivot end portion connected pivotally to and disposed between the brackets.

The pivot end portion has two opposite ends of different lengths that are respectively inserted into the pivot holes in the brackets. The pivot hole in each of the brackets has a diameter matching the length of a respective end of the pivot end portion.

At least one of the brackets has a restricting portion protruding toward the other one of the brackets to restrict a pivoting angle of the conductive ground element toward the interior of the metallic housing.

The conductive ground element is formed by stamping and bending a metal plate. The pivot end portion is located on a top end of the conductive ground element. The conductive ground element further has a bent portion that is disposed below and spaced apart from the pivot end portion and that forms an obtuse angle.

The conductive ground element further has an abutment end portion that is connected to the bent portion opposite to the pivot end portion and that is curved. The abutment end portion is configured to abut against a wall surface of the metallic housing that defines a bottom end of the mounting hole prior to installation of the circuit module into the metallic housing.

The conductive ground element further has a through hole between the pivot end portion and the bent portion for adjusting the resilience of the conductive ground element.

The front wall further has a limiting portion located between the brackets and protruding into the mounting hole to limit a pivoting angle of the conductive ground element toward an exterior of the metallic housing and to press the bent portion against the electrical connector.

According to another aspect of this invention, a conductive ground element is configured to be installed on a metallic housing having a mounting hole, and comprises a pivot end portion and a bent portion that are spaced apart from each other. The pivot end portion is configured to be pivotally disposed within the metallic housing. The bent portion is configured to be pivotable out of the mounting hole about the pivot end portion.

The effect of the present invention resides in that the conductive ground element is pivotally disposed on the metallic housing. Prior to installation of the circuit module, the conductive ground element is received within the metallic housing to avoid being bumped and damaged by an external object and to prevent inflicting injury to an operator. When the circuit module is installed, the bent portion of the conductive ground element can be pushed by the electrical connector to move out of the metallic housing and resiliently abut against the electrical connector so as to keep a stable contact with the electrical connector. Hence, static electricity of the electrical connector can indeed be conducted to the metallic housing.

BRIEF DESCRIPTION OF THE DRAWINGS

Other features and advantages of the present invention will become apparent in the following detailed description of the embodiment with reference to the accompanying drawings, of which:

FIG. 3 is a fragmentary perspective view of the embodiment, illustrating how a conductive ground element is connected to the metallic housing;

FIG. 4 is another fragmentary perspective view of the embodiment, with a portion of a side wall of the metallic housing being cut away to show an interior of the metallic housing;

FIG. 8 is a fragmentary perspective view of the embodiment, illustrating a bracket of the metallic housing having a pivot hole;

FIG. 9 is a fragmentary perspective view of the embodiment, illustrating another bracket of the metallic housing having a pivot hole; and FIG. 10 is a fragmentary perspective view of the embodiment, illustrating how the conductive ground element pivots out of the metallic housing when the circuit module is installed inside the latter.

DETAILED DESCRIPTION OF THE PREFERRED EMBODIMENT

Figure 1:
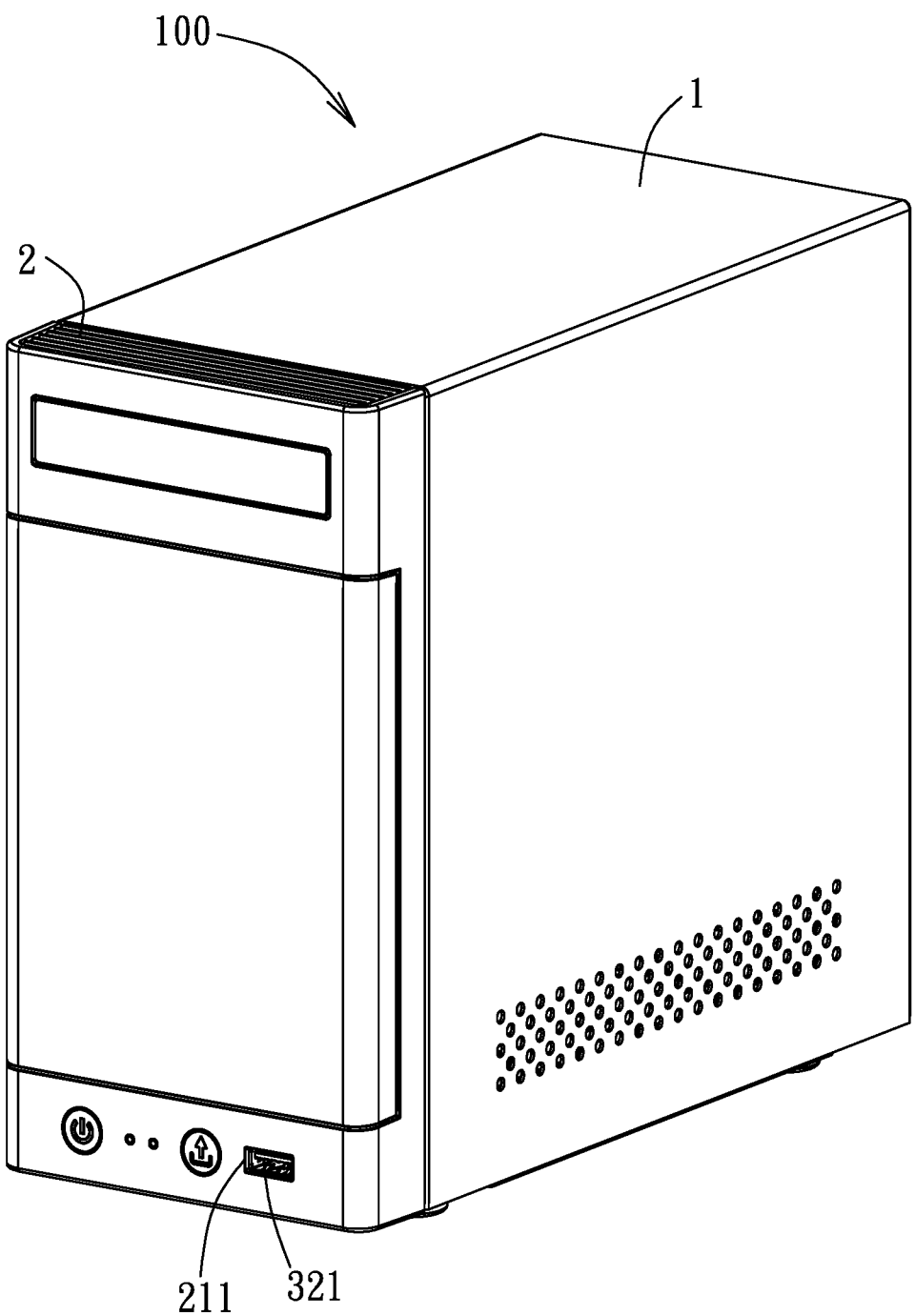
FIG. 1 is a perspective view of an embodiment of an electronic device according to the present invention.

The above-mentioned and other technical contents, features, and effects of this invention will be clearly presented from the following detailed description of one embodiment in coordination with the reference drawings.

Referring to FIGS. 1 to 4, an embodiment of an electronic device 100 according to the present invention comprises a metallic housing 1, a front cover 2, a circuit module 3, and a conductive ground element 4.

The metallic housing 1 includes a front wall 11 and a pair of spaced-apart brackets 12. The front wall 11 has a mounting hole 111 and a limiting portion 112. The brackets 12 are respectively located on left and right sides of the mounting hole 111, and extend from the front wall 11 toward an interior of the metallic housing 1. Each of the brackets 12 has a pivot hole 121 (see FIGS. 8 and 9). A left one of the brackets 12 further has a restricting portion 122 protruding toward a right one of the brackets 12. The mounting hole 111 is in spatial communication with the interior of the metallic housing 1. The limiting portion 112 is located between the brackets 12 and protrudes into the mounting hole 111.

The front cover 2 is assembled to the metallic housing 1 and covers the front wall 11. The front cover 2 is spaced apart from the front wall 11, and has an access slot 211 corresponding in position to the mounting hole 111.

Figure 2:
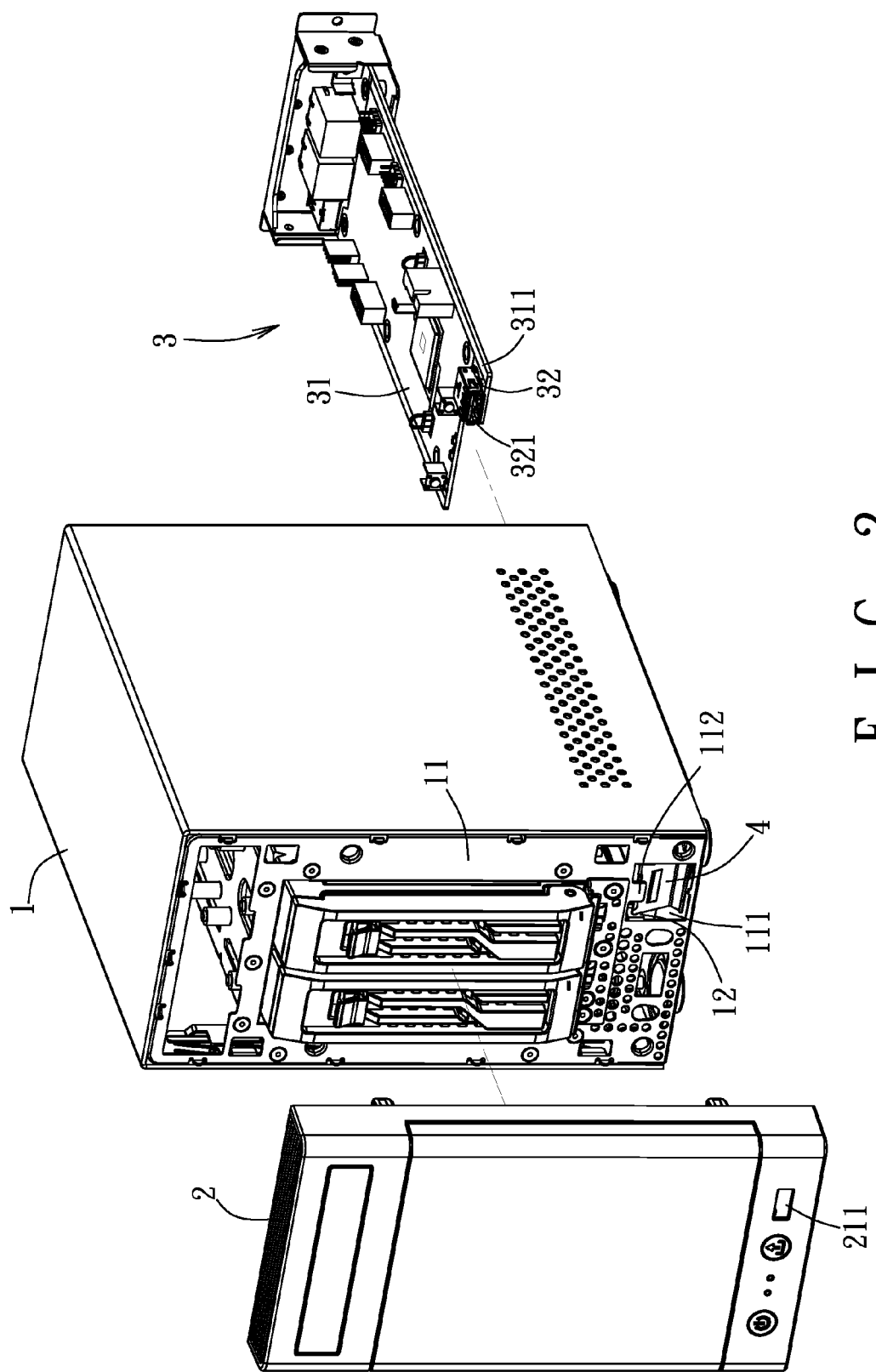
FIG. 2 is an exploded perspective view of a metallic housing, a front cover, and a circuit module of the embodiment.
Figure 5:
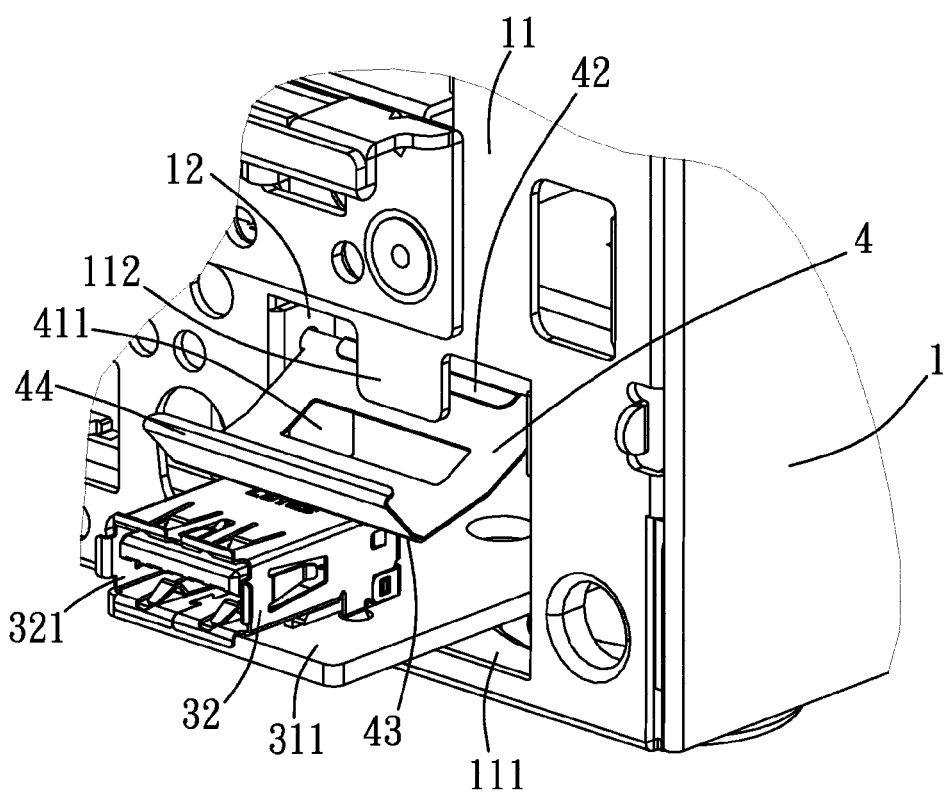
FIG. 5 is still another fragmentary perspective view of the embodiment, illustrating the conductive ground element abutting against an electrical connector when the circuit module is installed inside the metallic housing.
Figure 6:
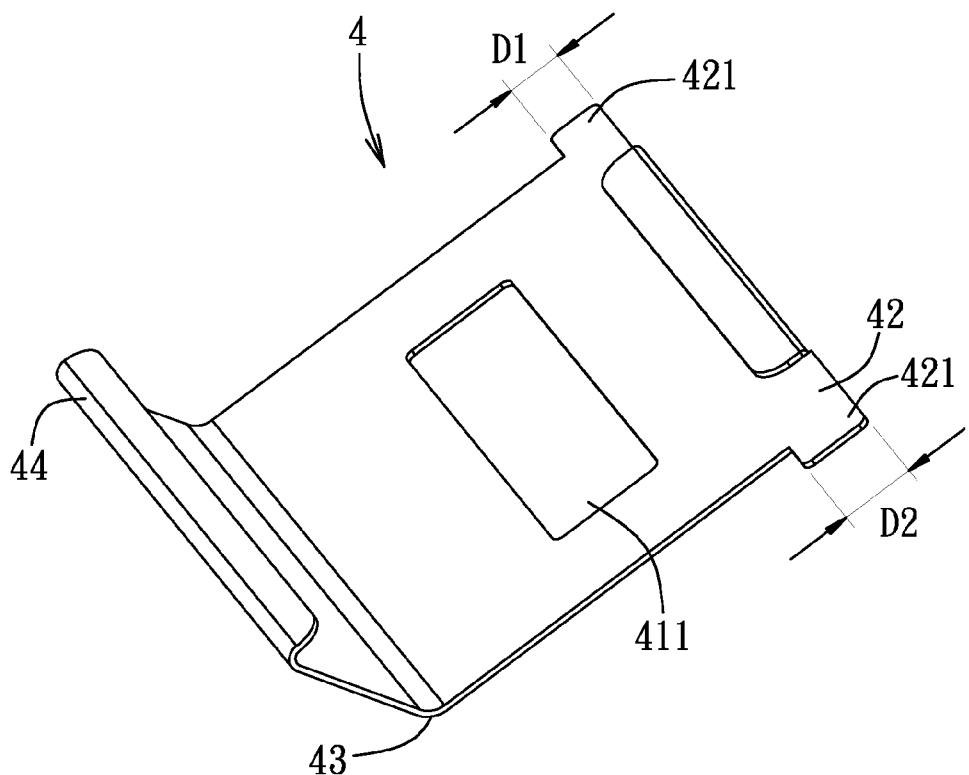
FIG. 6 is a perspective view of the conductive ground element.
Figure 7:
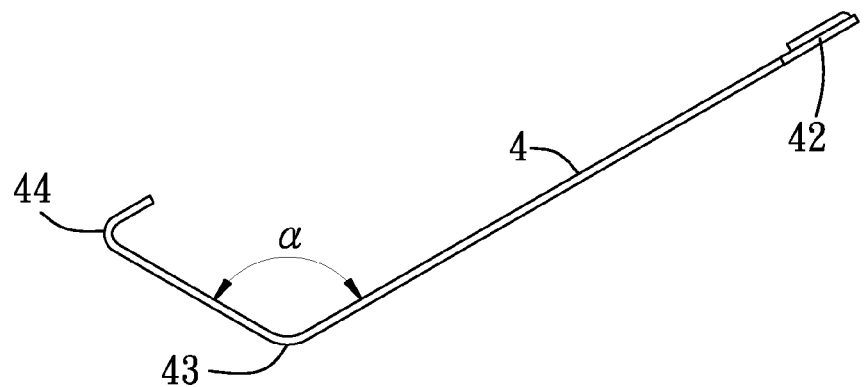
FIG. 7 is a schematic side view of the conductive ground element.

With reference to FIGS. 1, 2 and 5, the circuit module includes a circuit board 31 and an electrical connector 32. The circuit board 31 is disposed within the metallic housing 1 and has an extension 311 protruding out of the front wall 11 via the mounting hole 111. The electrical connector 32 is disposed on the extension 311 and has a connector port 321 exposed from the front cover 2 via the access slot 211.

With reference to FIGS. 3 to 7, the conductive ground element 4 is configured as an elongated bent plate that is formed by stamping and bending a metal plate so that the conductive ground element 4 has a pivot end portion 42 on a top end thereof, an abutment end portion 44 opposite to the pivot end portion 42 along a longitudinal direction of the conductive ground element 4, and a bent portion 43 that is between the pivot end portion 42 and the abutment end portion 44 and that forms an obtuse angle (α). The pivot end portion has two ends 421 spaced apart in a left-right direction. The ends 421 have different lengths which extend in the longitudinal direction of the conductive ground element 4. Further, the ends 421 are respectively inserted into the pivot holes 121 of the left and right brackets 12, so that the conductive ground element 4 is pivotally disposed within the metallic housing 1 in proximity to the mounting hole 111. Each of the pivot holes 121 has a diameter matching the length of a respective end 421. In particular, in this embodiment, a left one of the ends 421 of the pivot end portion 42 has a length (D1) smaller than the length (D2) of a right one of the ends 421, and the diameter of the pivot hole 121 in the left bracket 12 (see FIG. 8) is smaller than that of the pivot hole 121 in the right bracket 12 (see FIG. 9) so as to correspond to the left end 421. This design prevents reverse assembly of the conductive ground element 4 by an assembly operator.

As shown in FIGS. 3 and 4, prior to installation of the circuit module 3, the conductive ground element 4 is received within the metallic housing 1. The restricting portion 122 of the left bracket 12 restricts a pivoting angle of the conductive ground element 4 toward the interior of the metallic housing 1 so as to reduce the movement space of the conductive ground element 4 in the metallic housing 1. Further, in the absence of an external pushing force, the abutment end portion 44 abuts against a wall surface 14 of the metallic housing 1 that defines a bottom end of the mounting hole 111. As such, the conductive ground element 4 is restrictively received in the metallic housing 1 and will not arbitrarily rotate.

With reference to FIGS. 5 and 10, when the circuit module 3 is installed inside the metallic housing 1, the electrical connector 32 protrudes out of the metallic housing 1 from the interior of the metallic housing 1 via the mounting hole 111, and pushes the conductive ground element 4 to pivot outwardly. Because the abutment end portion 44 is curved, the conductive ground element 4 can easily slide out of the metallic housing 1 via the mounting hole 111. In addition, because the bent portion 43 has an obtuse angle (α) (see FIG. 7), the electrical connector 32 can easily push the bent portion 43 to move out of the metallic housing 1.

When positioning of the electrical connector 32 is reached, the bent portion 43 pivots out of the mounting hole 111 about the pivot end portion 42 and abuts against the electrical connector 32. Further, the limiting portion 112 of the metallic housing 1 abuts against the conductive ground element 4 to limit a pivoting angle of the conductive ground element 4 toward an exterior of the metallic housing 1 and to press the bent portion 43 against the electrical connector 32. Hence, static electricity of the electrical connector 32 can be conducted to the metallic housing 1. In addition, the conductive ground element 4 has a rectangular through hole 411 between the pivot end portion 42 and the bent portion 43 for adjusting the resilience of the conductive ground element 4, so that the bent portion can resiliently press against the electrical connector 32. That is, an appropriate elastic deformation of the conductive ground element 4 can be ensured to keep the conductive ground element 4 in a stable contact with the electrical connector 32.

To sum up, the conductive ground element 4 is pivotally disposed on the metallic housing 1. Prior to installation of the circuit module 3, the conductive ground element 4 is received within the metallic housing 1 to avoid being bumped and damaged by an external object and to prevent inflicting injury to an operator. When the circuit module 3 is installed, the bent portion 43 of the conductive ground element 4 can be pushed by the electrical connector 32 to move out of the metallic housing 1 and resiliently abut against the electrical connector 32 so as to keep a stable contact with the electrical connector 32. Hence, static electricity of the electrical connector 32 can indeed be conducted to the metallic housing 1.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electronic device, comprising:
   a metallic housing including a front wall which has a mounting hole in spatial communication with an interior of said metallic housing;
   a front cover assembled to said metallic housing and covering said front wall, said front cover being spaced apart from said front wall and having an access slot corresponding in position to said mounting hole;
   a circuit module including a circuit board disposed within said metallic housing and having an extension protruding out of said front wall via said mounting hole, and an electrical connector disposed on said extension and having a connector port exposed from said front cover via said access slot; and
   a conductive ground element having a pivot end portion connected pivotally to said metallic housing in proximity to said mounting hole, and a bent portion connected to and pivotable about said pivot end portion, said bent portion being pushed by said electrical connector to pivot out of said mounting hole and abut against said electrical connector to conduct static electricity of said electrical connector to said metallic housing, said conductive ground element being received in said metallic housing prior to installation of said circuit module in said metallic housing.

2. The electronic device as claimed in claim 1, wherein said metallic housing further includes a pair of spaced-apart brackets that extend from said front wall toward said interior of said metallic housing at two opposite sides of said mounting hole and that respectively have a pivot hole, said pivot end portion being connected pivotally to and disposed between said brackets.

3. The electronic device as claimed in claim 2, wherein said pivot end portion has two opposite ends of different lengths that are respectively inserted into said pivot holes in said brackets, said pivot hole in each of said brackets having a diameter matching the length of a respective said end of said pivot end portion.

4. The electronic device as claimed in claim 2, wherein at least one of said brackets has a restricting portion protruding toward the other one of said brackets to restrict a pivoting angle of said conductive ground element toward said interior of said metallic housing.

5. An electronic device, comprising:
   a metallic housing including a front wall which has a mounting hole in spatial communication with an interior of said metallic housing;
   a front cover assembled to said metallic housing and covering said front wall, said front cover being spaced apart from said front wall and having an access slot corresponding in position to said mounting hole;
   a circuit module including a circuit board disposed within said metallic housing and having an extension protruding out of said front wall via said mounting hole, and an electrical connector disposed on said extension and having a connector port exposed from said front cover via said access slot; and
   a conductive ground element disposed pivotally within said metallic housing in proximity to said mounting hole and abutting against said electrical connector to conduct static electricity of said electrical connector to said metallic housing;
   wherein said metallic housing further includes a pair of spaced-apart brackets that extend from said front wall toward said interior of said metallic housing at two opposite sides of said mounting hole and that respectively have a pivot hole, said conductive ground element having a pivot end portion connected pivotally to and disposed between said brackets; and
   wherein said conductive ground element is formed by stamping and bending a metal plate, said pivot end portion being located on a top end of said conductive ground element, said conductive ground element further having a bent portion that is disposed below and spaced apart from said pivot end portion and that forms an obtuse angle.

6. The electronic device as claimed in claim 5, wherein said conductive ground element further has an abutment end portion that is connected to said bent portion opposite to said pivot end portion and that is curved, said abutment end portion being configured to abut against a wall surface of said metallic housing that defines a bottom end of said mounting hole prior to installation of said circuit module into said metallic housing.

7. The electronic device as claimed in claim 5, wherein said conductive ground element further has a through hole between said pivot end portion and said bent portion for adjusting the resilience of said conductive ground element.

8. The electronic device as claimed in claim 5, wherein said front wall further has a limiting portion located between said brackets and protruding into said mounting hole to limit a pivoting angle of said conductive ground element toward an exterior of said metallic housing and to press said bent portion against said electrical connector.

9. A conductive ground element configured to be installed on a metallic housing having a mounting hole, said conductive ground element comprising a pivot end portion and a bent portion that are spaced apart from each other, said pivot end portion being configured to be pivotally disposed within the metallic housing, said bent portion being configured to be pivotable out of the mounting hole about said pivot end portion;

wherein said conductive ground element is formed by stamping and bending a metal plate, said pivot end portion being located on a top end of said conductive ground element, said bent portion being disposed below said pivot end portion and forming an obtuse angle.

10. The conductive ground element as claimed in claim 9, further comprising an abutment end portion that is connected to said bent portion opposite to said pivot end portion and that is curved.

11. The conductive ground element as claimed in claim 9, further comprising a through hole between said pivot end portion and said bent portion for adjusting the resilience of said conductive ground element.

12. The conductive ground element as claimed in claim 9, wherein said pivot end portion has two opposite ends of different lengths.

\* \* \* \* \*